US00RE38816E

(19) United States
(12) Reissued Patent
Baudin

(10) Patent Number: US RE38,816 E
(45) Date of Reissued Patent: Oct. 11, 2005

(54) DISPENSING CAP WITH GRIPPING MEANS

(75) Inventor: Gilles Baudin, Domont (FR)

(73) Assignee: L'Oreal, Paris (FR)

(21) Appl. No.: 09/292,334

(22) Filed: Apr. 15, 1999

Related U.S. Patent Documents

Reissue of:
(64) Patent No.: 5,865,353
Issued: Feb. 2, 1999
Appl. No.: 08/917,772
Filed: Aug. 27, 1997

(30) Foreign Application Priority Data

Aug. 29, 1996 (FR) ..... 96 10577

(51) Int. Cl.[7] ..... B67D 47/00; B65D 43/14; B65D 39/00

(52) U.S. Cl. ..... 222/546; 222/556; 215/235; 215/237; 215/364; 220/833; 220/838

(58) Field of Search ..... 215/303, 305, 215/237, 235, 364; 222/546, 556; 220/335, 339

(56) References Cited

U.S. PATENT DOCUMENTS

| | | | | | |
|---|---|---|---|---|---|
| 2,074,830 | A | * | 3/1937 | Conner | 215/295 |
| 2,394,135 | A | * | 2/1946 | Baar | 215/295 |
| 3,307,752 | A | * | 3/1967 | Anderson | 222/546 |
| 3,898,046 | A | * | 8/1975 | Ikeda et al. | 23/259 |
| 4,087,028 | A | * | 5/1978 | Lang | 222/556 |
| 4,377,248 | A | * | 3/1983 | Stull | 222/543 |
| 4,625,898 | A | * | 12/1986 | Hazard | 222/546 |
| 4,626,185 | A | * | 12/1986 | Monnet | 425/110 |
| 4,711,372 | A | * | 12/1987 | Gach | 222/153.06 |
| 4,813,560 | A | * | 3/1989 | Begley | 222/546 |
| 4,995,521 | A | * | 2/1991 | von Schuckmann | 215/355 |
| 5,169,035 | A | * | 12/1992 | Imbery, Jr. | 222/546 |
| 5,221,017 | A | * | 6/1993 | Cistone et al. | 215/235 |
| 5,251,793 | A | * | 10/1993 | Bolen, Jr. et al. | 222/546 |
| 5,305,900 | A | * | 4/1994 | Maguire et al. | 222/546 |
| 5,314,084 | A | * | 5/1994 | Folta et al. | 215/258 |
| 5,328,058 | A | * | 7/1994 | Leoncavallo et al. | 222/546 |
| 5,437,383 | A | * | 8/1995 | Stull | 215/235 |
| 5,497,906 | A | * | 3/1996 | Dubach | 222/546 |
| 5,501,348 | A | * | 3/1996 | Takeuchi | 215/235 |
| 5,769,253 | A | * | 6/1998 | Gross | 215/235 |
| 5,865,353 | A | * | 2/1999 | Baudin | 222/546 |
| 5,950,848 | A | * | 9/1999 | Baudin | 222/546 |

FOREIGN PATENT DOCUMENTS

| | | | |
|---|---|---|---|
| CH | 683833 | A5 * | 5/1994 |
| DE | 9306802 | * | 11/1994 |
| EP | 0575764 | A1 * | 12/1993 |
| FR | 2662144 | * | 11/1991 |

* cited by examiner

*Primary Examiner*—Henry C. Yuen
(74) *Attorney, Agent, or Firm*—Oblon, Spivak, McClelland, Maier & Neustadt, P.C.

(57) ABSTRACT

A dispensing cap intended to equip a reservoir containing a liquid or viscous product includes a body provided with at least one dispensing opening and a lid articulated to the body around an axis. The lid is intended to stopper the dispensing opening in the storage position. The body and the lid are made of a rigid or semirigid material. At least one gripping zone is arranged on the lid and/or the body to facilitate the opening and/or closing of the lid, the gripping zone being formed by an elastomeric material.

26 Claims, 1 Drawing Sheet

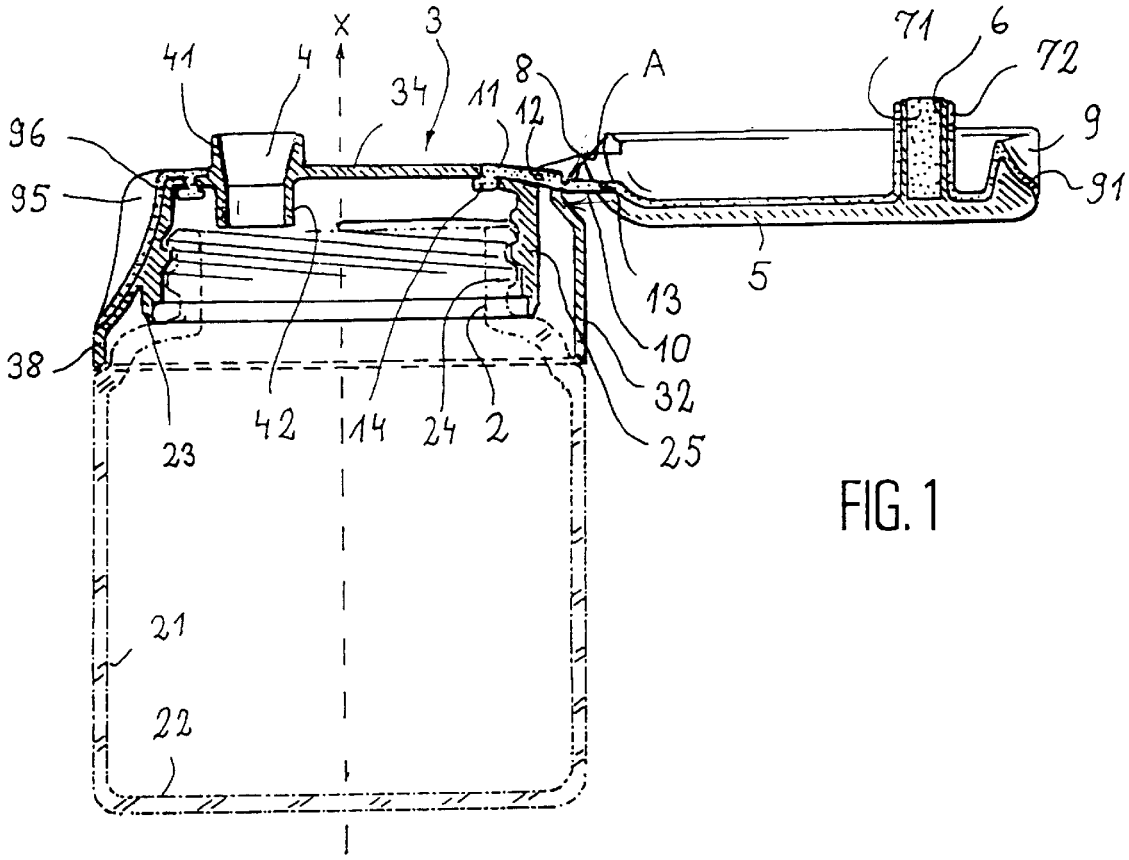
FIG. 1
FIG. 2
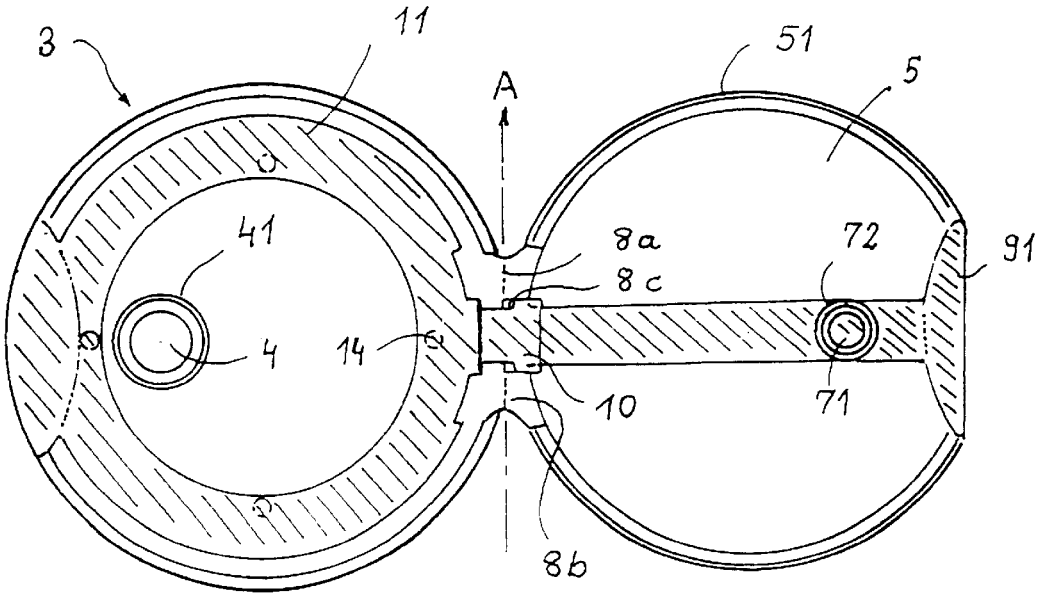

DISPENSING CAP WITH GRIPPING MEANS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a dispensing cap intended for a reservoir containing a fluid product to be dispensed, as well as a dispensing unit equipped with this cap. More particularly, the present invention relates to a cap having an opening for dispensing a product, obturable by a pivoting lid. It is provided with a stoppering system capable of being opened for the dispensing of the product, and closed for its preservation.

2. Description of the Related Art

Reservoirs fitted with a cap of this kind are customarily used in different fields for the storage and dispensing of liquid products, for example, in the cosmetic, food, household, pharmaceutical or parapharmaceutical fields. These products may be, in particular, shampoos, antiseptics, household cleaning materials or dishwashing products. By use of a dispensing cap, it is possible to avoid leakage of the product during its carriage and storage and the product is protected from external contamination. Moreover, with such a cap the user can easily dispense the product contained in the reservoir.

A dispensing cap of this kind is described, for example, in European Patent Application EP-A-0 629 560. This document describes a dispensing cap having a dispensing opening and a lid pivotable by means of a film hinge. This lid is provided with a stopper intended to stopper the dispensing opening in the storage position. On the side opposite to the hinge, the lid has a gripping projection situated opposite a recess in the side wall of the cap. This projection has the drawback that there is the risk of hurting the user's thumb, or of breaking his nail, when the lid is being opened. Moreover, the gripping zone is not always easy to locate.

SUMMARY OF THE INVENTION

Consequently, it is an object of the present invention to remedy the drawbacks of the prior art, and to provide a dispensing cap of a pleasing appearance whose cost is competitive and which is, moreover, very reliable in its stoppering action.

Moreover, it is a further object of the invention to provide a handy cap that is easy to open, where the gripping zone can be easily located and manipulated by the user.

Thus a first aspect of the present invention provides a dispensing cap intended for a reservoir containing a liquid or viscous product, comprising a body provided with at least one dispensing opening and a lid articulated to the body round an axis, the lid being intended to stopper the dispensing opening in the storage position, the body and the lid being made of a rigid or semirigid material. At least one gripping zone is arranged on the lid and/or the body to facilitate the opening and/or closing of the lid, the gripping zone being formed by an elastomeric material.

The invention also relates to a dispensing cap wherein the elastomeric material is deposited by dual or duplicate injection moulding, on the body and/or the lid made of a rigid material.

The invention also provides a dispensing unit comprising a product reservoir equipped with a dispensing cap according to the first aspect of the invention.

Generally, the reservoir equipped with such a cap is constituted by a bottle of a rigid or semirigid consistency or by a compressible tube. Preferably, this reservoir has a neck whereon the dispensing cap is fixed by screwing, catch engagement, overmoulding, welding or any other known means.

The product to be dispensed is capable of flowing under its own weight and is, for example, a shampoo or a body lotion whose viscosity is generally in the range of from 50 mpa·s to 5 Pa·s, or a pulverulent powder.

Generally the rigid or semirigid material is chosen from polypropylenes or polyethylenes. Advantageously, the elastomeric material is a thermoplastic elastomer physically/chemically compatible with the rigid or semirigid material. Thus by first injecting the rigid or semirigid material into the mould, and by subsequently adding the flexible material in a duplicate injection moulding process, a bond is created between the elastomeric material and the rigid or semirigid material. This thermoplastic elastomer is chosen, for example, from the group of copolymers of propylene/ethylene; polyether blocamides; polyvinyls; terpolymers of ethylene, of propylene and of a diene (EPDM); sequenced polymers of styrene-butadiene (SBS); sequenced polymers of styrene-ethylene-butadiene (SEBS-SIS); thermoplastic polyurethanes; and mixtures of polypropylene with one of the following elastomers: sequenced polymers of styrene-ethylene-butadiene (SEBS-SIS), terpolymers of ethylene, of propylene and of a diene (EPDM), and sequenced polymers of styrene-butadiene (SBS).

The elastomeric material may have a color different from that of the rigid or semirigid material. Thus the gripping zone or zones on the cap can be easily located by the user. Moreover, a pleasing decorative effect may be obtained by applying a color to the gripping zone. In an embodiment of the invention, the gripping zone arranged on the body is formed by a concave sunk portion in the form of a circular arc.

Preferably, the gripping zone may also be arranged on the lid at a place diametrically opposite the hinge. This zone is preferably formed by a concave bent portion in the form of a hollow impression wherein the user's finger comes to bear to raise the lid. A gripping zone can, of course, be provided on the lid and on the cap body respectively.

By choosing a particular elastomeric material, for example, a mixture of polypropylene with terpolymers of ethylene, propylene and a diene (EPDM), it is even possible to obtain an "antislip" effect, which is advantageous when the user uses a surfactant cleansing product in a shower or in the bath. Indeed, when the consumer uses a reservoir fitted with a conventional dispensing cap made of polypropylene, in particular in a shower with his hands wetted by water or a shampoo, this cap has a tendency to slide in his hands, making the opening of such a cap difficult to perform. Thanks to this feature of the invention, the sliding of the cap in the user's hands can be avoided.

Generally, the lid is provided with a stoppering plug intended to stopper the dispensing opening in the storage position. In this case, a covering made of a flexible elastomeric material can then be disposed on the stopper or inside the opening to ensure a good seal between the stopper and the opening in the storage position. This makes it possible to compensate for any possible play between the stopper and the opening, or for deformations of the stopper or the opening due to their removal from the mold. This covering moreover ensures a good seal over the whole duration of use of the product.

Preferably, when the stopper is hollow and formed with a cylindrical skirt, it can be filled with a flexible material. This is advantageous, since any temporary trapping of product residues inside the stopper is avoided, which residues the risk of it flowing out inopportunely when the lid is being opened.

Moreover, the body of the cap may have an annular gasket made of a flexible material in a zone situated on the upper side opposite the lid, which gasket is in leakproof contact with a peripheral edge of the lid when the lid is in its folded-down position.

The lid is articulated to the cap by means of a hinge pivoting round an articulation axis, for example, a film hinge. The cap of the invention may moreover have at least one connecting element overmolded in a flexible thermoplastic material and elastically deformable in elongation, forming a spring. One of the ends of the connecting element is connected to the body, the other connected to the lid, the connecting element being mounted in such a way as to be situated on one side of the articulation axis in the open position, and on the other side of the articulation axis, in the closed position of the lid, the connecting element being subjected, when passing from one of the open and closed positions to the other, to an elongation whose maximum is reached when the connecting element passes in the region of the articulation axis. Once the maximum elongation zone has been crossed, the lid is restored either into its open position or into its closed or partly closed position.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows an axial sectional view of a reservoir provided with a dispensing cap in accordance with the invention, in its open position; and FIG. 2 shows a top view of the cap of FIG. 1.

DETAILED DESCRIPTION OF THE PREFERRED EMBODIMENT

Referring to FIGS. 1 and 2, a dispensing unit comprising a reservoir 21 having a longitudinal axis X is equipped with a dispensing cap 3 provided with a body 32. The reservoir 21 has a closed bottom 22 and, at the end opposite side to the bottom, a neck 2 provided with an external thread 24 for fixing the cap body 32 on the reservoir. For this purpose, the cap body has an internal cylindrical skirt 25 provided with an internal thread complementary to the thread 24 of the neck 2. The reservoir 21 has a generally circular or oval cross-section, but the cross-section may be of any other shape, for example, polygonal or asymmetrical. It is made, for example, of high density polyethylene. As for the body of the cap, it is made of a rigid or semirigid material, such as polypropylene.

The body 32 of the cap 3 has a plate 34 provided at its circumference with a film hinge 8, by means of which a lid 5 is articulated to the cap, allowing the lid to pivot around an articulation axis A forming the axis of the hinge. The lid 5 has a concave shape turned towards the reservoir and provided with a peripheral edge 51. A dispensing opening 4 is provided in the plate 34 on the opposite side to the hinge 8 and in a plane passing through the hinge and through the longitudinal axis X of the reservoir 21. The opening 4 is defined by a cylindrical tube 41, 42 extending to either side of the plate 34. An emergent portion 41 of the tube has an outwardly flaring conical internal shape. This tube constitutes a flow reducer, the emergent portion 41 having the function of a spout.

The hinge 8 is formed of two parts 8a, 8b separated by a recess 8c. Two small bars 12, 13 with an orientation parallel to the articulation axis A pass through the recess. These bars 12, 13 are embedded in a flat strip 10 made of an elastomeric material and form means for anchoring the strip. The strip 10 forms an elastic connecting element between the lid 5 and the body 32. The ends of the strip 10 are respectively joined to the body 32 of the cap and the lid 5 respectively, the attachment of this strip 10 to the body 32 and the lid 5 being obtained by the thermofusion of the respective materials during the manufacture of the cap 3. To further reinforce the strip 10, additional anchorage points 14 may be provided on each portion adjoining the ends of the strip 10. This strip 10 is disposed slightly beneath the articulation axis A of the hinge, that is, on the side towards the reservoir, so that in the fully open position the lid 5 is kept in this position by the elasticity of the flexible strip 10. When the lid 5 is closed, it pivots about the axis A which causes the strip 10 to extend. When the lid reaches a position of maximum extension of the strip 10, the elasticity of the strip 10 restores the lid 5 into a partly open position. From the partly open position, the lid 5 can be closed completely by causing the stopper 6 to frictionally enter to the opening 4. The flexible strip 10 is made, for example, of a mixture of polypropylene with a block polymer of styrene-ethylene-butylene-styrene.

In the folded-down position of the lid, the dispensing opening 4 is closed by a stopper or stoppering element 6 obturating the tubular portion 41. This stopper 6 is hollow and carries an external covering 72 made of a flexible material. The internal diameter of the tubular portion and the external diameter of the covering 72 are chosen in such a way that when the lid is being closed the stopper 6 can enter with friction into the opening 4 in a leakproof manner. Advantageously, these diameters are of the order of 3 to 8 mm, depending on the viscosity of the product to be dispensed. This viscosity is typically in the range extending from 50 mPa·s to 5 Pa·s.

Of course, it is possible to make a reverse arrangement, that is to say, to dispose the covering 72 of a flexible material inside the opening 4. As may be seen in FIGS. 1 and 2, the inside 71 of the stopper 6 is filled with a flexible material.

As illustrated in particular in FIG. 2, the plate 34 has at its circumference an annular gasket 11 made of a flexible material. It is disposed so that the edge 51 of the lid 5 bears against this gasket 11 in the closed position of the cap.

On the opposite side to the hinge 8, the skirt 38 has a recessed zone 95, for example in the form of a circular arc, facilitating the gripping and opening of the lid 5. The surface 96 of this zone is constituted by a layer of a flexible material. Similarly, the lid 5 has a gripping zone 91 in the form of a concave bent portion 9, this zone also being formed of a flexible material such as an elastomer. The use of a flexible material for the gripping zones provides the user with a pleasant feel and easy manipulation of the cap by choosing a particular flexible material, for example, SANTOPRENE™ (a mixture of polypropylene with terpolymers of ethylene, propylene and a diene (EPDM)), marketed by the AES Company. By using a material of this type, it is even possible to obtain an "antislip" effect, which is advantageous when the user uses a surfactant body cleansing product in a shower or in the bath.

Advantageously, the color chosen for the flexible material is different from that of the rigid or semirigid material. Thus the gripping zones 91, 96 can be easily located by the user wishing to use the product. These colored zones may, moreover, constitute an aesthetic element and be made in any varied shape.

The way of obtaining the cap in accordance with the invention is very simple. Advantageously, the cap is manufactured in a single molding cycle of short duration by the successive duplicate injection molding of rigid or semirigid and elastomeric materials respectively. This cap can then be manufactured at an advantageous cost.

Obviously, numerous modifications and variations of the present invention are possible in light of the above teachings. It is therefore to be understood that the invention may be practiced otherwise than as specifically described herein.

What is claimed is:

1. A dispensing cap for a reservoir containing a liquid or viscous product, comprising:

a rigid or semirigid body having at least one dispensing opening;

a rigid or semirigid lid articulated to the body around an articulation axis so as to stopper the dispensing opening in a storage position of the lid; and at least one connecting element overmolded in a thermoplastic material, and elastically deformable in elongation along a length of the at least one connecting element to form a spring, one of the ends of the connecting element being connected to the body, the other end being connected to the lid, and the connecting element being mounted in such a way as to be situated on one side of the articulation axis in an open position and on the other side of the axis in a closed position of the lid; and wherein when the connecting element passes from one of the positions to the other, the at least one connecting element is subjected to an elongation whose maximum is reached when connecting element passes in the region of the articulation axis, wherein a gripping zone formed of an elastomeric material is arranged on at least one of the lid and the body to facilitate opening and closing of the lid.

2. The cap according to claim 1, wherein the rigid or semirigid material is chosen from the group consisting of polypropylenes and polyethylenes.

3. The cap according to claim 1, wherein the elastomeric material is a thermoplastic elastomer compatible with the rigid or semirigid material so as to be capable of creating a mechanical bond with the rigid or semirigid material by thermofusion.

4. The cap according to claim 1, wherein the elastomeric material has a color different from that of the rigid or semirigid material.

5. The cap according to claim 1, wherein the elastomeric material is chosen from the group consisting of copolymers of propylene/ethylene; polyether blocamides; polyvinyls; terpolymers of ethylene, propylene and of a diene (EPDM); sequenced polymers of styrene-butadiene (SBS); sequenced polymers of styrene-ethylene-butadiene (SEBS-SIS); thermoplastic polyurethanes; and mixtures of polypropylene with one of the following elastomers: sequenced polymers of styrene-ethylene-butadiene (SEBS-SIS), terpolymers of ethylene, propylene and of a diene (EPDM), and sequenced polymers of styrene-butadiene (SBS).

6. The cap according to claim 1, wherein the lid includes a stoppering plug capable of stoppering the dispensing opening in the storage position, wherein a covering of an elastomeric material is situated on the stoppering plug or inside the opening to ensure the seal between the stoppering plug and the opening in the storage position.

7. The cap according to claim 6, wherein the stoppering plug is filled with the elastomeric material.

8. The cap according to claim 1, wherein the body has the annular gasket made of an elastomeric material in leakproof contact with a peripheral edge of the lid when the lid is in its storage position.

9. The cap according to claim 1, wherein the lid is articulated on the body by means of a film hinge.

10. The cap according to claim 1, wherein the gripping zone is formed as a concave recessed portion in the form of a circular arc.

11. The cap according to claim 1, wherein the gripping zone is situated diametrically opposite the hinge.

12. The cap according to claim 1, wherein the gripping zone is formed by a concave bent portion of the lid.

13. The dispensing cap according to claim 1, wherein the elastomeric material is deposited on the rigid or semirigid material by duplicate injection molding.

14. A unit for dispensing a fluid product, comprising:

a reservoir containing a fluid product;

a cap comprising a rigid or semirigid body having at least one dispensing opening, and a rigid or semirigid lid articulated to the body around an articulation axis so as to stopper the dispensing opening in a storage position of the lid, wherein a gripping zone formed of an elastomeric material is arranged on at least one of the lid and the body to facilitate opening and closing of the lid; and at least one connecting element overmolded in a thermoplastic material, and elastically deformable in elongation along a length of the at least one connecting element to form a spring, one of the ends of the connecting element being connected to the body, the other end being connected to the lid, and the connecting element being mounted in such a way as to be situated on one side of the articulation axis in an open position and on the other side of the axis in a closed position of the lid; and wherein when the connecting element passes from one of the positions to the other, the at least one connecting element is subjected to an elongation whose maximum is reached when connecting element passes in the region of the articulation axis.

*15. A dispensing cap for a reservoir containing a liquid or viscous product comprising:*

*a rigid or semirigid body having at least one dispensing opening;*

*a rigid or semirigid lid articulated to the body around an articulation axis so as to stopper the dispensing opening in a storage position of the lid, the articulation is formed by a film hinge so that the body and the lid constitute one single piece, wherein a gripping zone formed of a bi-injected elastomer material is arranged on at least one of the lid and the body to facilitate opening and closing of the lid,*

*wherein said body comprises a skirt with a recessed portion, and said gripping zone is arranged on said recessed portion.*

*16. The cap according to claim 15, wherein the elastomeric material is a thermoplastic elastomer compatible with the rigid or semirigid material so as to be capable of creating a mechanical bond with the rigid or semirigid material by thermofusion.*

*17. The cap according to claim 15, wherein the elastomeric material has a color different from that of the rigid or semirigid material.*

*18. The dispensing cap according to claim 15, wherein the elastomeric material is deposited on the rigid or semirigid material by duplicate injection molding.*

*19. The dispensing cap according to claim 15, wherein said lid comprises a lid gripping zone.*

*20. The dispensing cap according to claim 19, wherein said lid gripping zone is arranged above said gripping zone on said skirt when said lid is in said storage position.*

*21. The dispensing cap according to claim 19, wherein said lid gripping zone is formed in a concave portion of said lid.*

*22. The dispensing cap according to claim 15, further comprising an elastic strip having one end connected to said lid and another end connected to said body, wherein said elastic strip passes through an elongation maximum when said lid moves from an open position to said storage position.*

*23. The dispensing cap according to claim 15, wherein said lid comprises a stopper which enters into said dispensing opening when said lid moves to said storage position.*

*24. The dispensing cap according to claim 23, wherein said stopper is covered with a flexible material so that said stopper enters said dispensing opening with friction when said lid is placed in said position.*

*25. The dispensing cap according to claim 23, wherein said dispensing opening is formed in a tubular portion covered with a flexible material so that said stopper enters said dispensing opening with friction when said lid is placed in said storage position.*

*26. The dispensing cap according to claim 23, wherein said stopper is hollow and filled with a flexible material.*

* * * * *

UNITED STATES PATENT AND TRADEMARK OFFICE

CERTIFICATE OF CORRECTION

PATENT NO. : RE 38,816 E
DATED : October 11, 2005
INVENTOR(S) : Gilles Baudin

It is certified that error appears in the above-identified patent and that said Letters Patent is hereby corrected as shown below:

Column 8,
Line 7, change "said position" to -- said storage position --.

Signed and Sealed this

Twenty-first Day of March, 2006

JON W. DUDAS
*Director of the United States Patent and Trademark Office*